United States Patent [19]

Schwarzmann et al.

[11] Patent Number: 4,775,296

[45] Date of Patent: Oct. 4, 1988

[54] COOLABLE AIRFOIL FOR A ROTARY MACHINE

[75] Inventors: Russell A. Schwarzmann, Marlborough; William R. Sevcik, Jr., Manchester, both of Conn.

[73] Assignee: United Technologies Corporation, Hartford, Conn.

[21] Appl. No.: 334,617

[22] Filed: Dec. 28, 1981

[51] Int. Cl.[4] .............................. F01D 5/18
[52] U.S. Cl. .................... 416/97 R; 415/115
[58] Field of Search ............. 415/115, DIG. 1; 416/90 R, 92, 91, 96 A, 97 R

[56] References Cited

U.S. PATENT DOCUMENTS

| | | | |
|---|---|---|---|
| 3,017,159 | 1/1962 | Foster et al. | 253/39.15 |
| 3,094,310 | 6/1963 | Bowmer | 253/39.15 |
| 3,111,302 | 11/1963 | Bowmer | 416/90 |
| 3,171,631 | 3/1965 | Aspinwall | 416/90 |
| 3,370,829 | 2/1968 | Banthin et al. | 415/115 |
| 3,542,486 | 11/1970 | Kercher et al. | 415/115 |
| 3,628,880 | 12/1971 | Smuland et al. | 415/115 |
| 3,628,885 | 12/1971 | Sidenstick et al. | 416/97 R |
| 3,656,863 | 4/1972 | DeFeo | 416/97 |
| 3,688,833 | 9/1972 | Bykov et al. | 164/283 |
| 3,738,771 | 6/1973 | Delarbre et al. | 416/96 |
| 4,019,831 | 4/1977 | Franklin et al. | 416/97 |
| 4,073,599 | 2/1978 | Allen et al. | 416/97 R |
| 4,105,364 | 8/1978 | Dodd et al. | 415/115 X |
| 4,180,373 | 12/1979 | Moore et al. | 415/115 X |
| 4,236,870 | 12/1980 | Hucul, Jr. et al. | 415/115 X |
| 4,257,737 | 3/1981 | Andress et al. | 416/97 |
| 4,278,400 | 7/1981 | Yamarik et al. | 415/115 X |
| 4,292,008 | 9/1981 | Grosjean et al. | 415/115 |
| 4,353,679 | 10/1982 | Hauser | 415/115 |
| 4,416,585 | 11/1983 | Abdel-Messeh | 416/97 |
| 4,627,480 | 12/1986 | Lee | 164/369 |

FOREIGN PATENT DOCUMENTS

| | | | |
|---|---|---|---|
| 1336704 | 6/1972 | United Kingdom | 416/96 A |
| 1410014 | 10/1975 | United Kingdom | 416/97 |
| 1543707 | 4/1979 | United Kingdom | 415/115 |

OTHER PUBLICATIONS

Howmet, Howmet Corporation, "Complex Coring in Airfoil Castings", E. L. Champion, Chief Engineer, Misco Corp.

Primary Examiner—Harvey C. Hornsby
Assistant Examiner—Frankie L. Stinson
Attorney, Agent, or Firm—Gene D. Fleischhauer

[57] ABSTRACT

A coolable airfoil 10 for rotary machines is disclosed. The airfoil has a passage 54 extending spanwisely through the leading edge region 26 of the blade. The first passage has a plurality of trip strips 66s, 66p canted toward the approaching flow and angled with respect to the wall in the leading edge region to turbulently increase the amount of cooling flowed to the forward most portion of the passage in the leading edge region. In one embodiment, a hole 72 in fluid communication with a turning passage 64 in the tip region of the blade downstream of the first passage is in fluid communication with the trailing edge of the blade.

10 Claims, 2 Drawing Sheets

COOLABLE AIRFOIL FOR A ROTARY MACHINE

DESCRIPTION

TECHNICAL FIELD

This invention relates to coolable airfoils used in high temperature rotary machines and more specifically to structure for cooling such airfoils. The concepts disclosed have application to both turbine vanes and turbine blades.

BACKGROUND ART

A rotary machine burns fuel in combustion chambers to provide energy to the machine in the form of hot working medium gases. The hot working medium gases are flowed to the turbine section of the machine. In the turbine section, airfoils form stationary arrays of stator vanes and rotating arrays of rotor blades. These airfoils are employed to direct the flowing gases and to extract energy from the gases. As a result, the airfoils are bathed in a hot working medium gases during operation of the engine causing thermal stresses in the airfoils which affect the structural integrity and fatigue life of the airfoil. These thermal stresses have been a constant source of concern since the advent of high temperature rotary machines, such as gas turbine engines, because of the need to operate the engine at high temperatures to maximize engine efficiency. For example, the airfoils in the turbines of such engines may see temperatures in the working gases as high as 2,500° F. life of the airfoil by reducing the level of thermal stresses in the airfoil One early approach to airfoil cooling is shown in U.S. Pat. No. 3,171,631 issued to Aspinwall entitled "Turbine Blade". In Aspinwall, cooling air is flowed to the cavity between the suction sidewall and the pressure sidewall of the airfoil and diverted to various locations in the cavity by the use of turning pedestals or vanes. The pedestals also serve as support members for strengthening the blade structure.

As time passed, more sophisticated approaches employing tarturous passages were developed as exemplified in the structure shown in U.S. Pat. No. 3,533,712 issued to Kercher entitled "Cooled Vane Structure for High Temperature Turbines". Kercher discloses the use of serpentine passages extending throughout the cavity in the blade to provide tailored cooling to different portions of the airfoil. The airfoil material defining the passages provides the necessary structural support to the airfoil.

Later patents, such as U.S. Pat. No. 4,073,599 issued to Allen et al entitled "Hollow Turbine Blade Tip Closure" disclose the use of intricate cooling passages coupled with other techniques to cool the extending passage in the leading edge region of the blade. The flowing air in the passage also convectively cools the leading edge region as did the passage in Aspinwall.

The cooling of turbine airfoils using intricate cooling passages and film cooling holes alone or in conjunction with trip strips to promote cooling of the leading edge region are the subject of many of the latest patents such as: U.S. Pat. No. 4,177,010 issued to Greaves et al entitled "Cooled Rotor Blade for A Gas Turbine Engine" (film cooling holes); U.S. Pat. No. 4,180,373 issued to Moore et al entitled "Turbine Blade" (film cooling holes and trip strips); U.S. Pat. No. 4,224,011 issued to Dodd et al entitled "Cooled Rotor Blade for A Gas Turbine Engine" (film cooling holes); and U.S. Pat. No. 4,278,400 issued to Yamarik et al entitled "Coolable Rotor Blade" (film cooling holes and trip strips). These blades are typified by large cooling air passages in relation to the thickness of the walls in the leading edge region of the blade.

Recent aerodynamic studies suggest that an elliptical leading edge has advantages in performance during operation of the gas turbine engine. The elliptical leading edge is used in conjunction with an airfoil that has a thinner cross-sectional shape (thickness to chord length) as compared with prior airfoils. Despite the thinness of the profile, a minimum thickness of the walls is required to provide structural support to the airfoil and to enable the airfoil to sustain a certain amount of statistically expected foreign object damage. The result has been the advent of a new airfoil having an elliptical leading edge for aerodynamic purposes and having thicker walls relative to the size of the cooling air passages in comparison to the relationship between the walls and the size of the passages in prior airfoils. In addition, in the interest of fuel efficiency, it is not desirable in certain stages of the turbine to use film cooling for the leading edge region of the airfoil.

Accordingly, scientists and engineers are seeking to develop coolable airfoils for use in high temperature turbines which efficiently use cooling air, which cool adequately the leading edge region of airfoils with narrow passages in comparison to the thickness of the airfoil walls and yet which avoid the discharge of cooling air through film cooling from the leading edge region of the airfoil.

DISCLOSURE OF INVENTION

According to the present invention, a coolable airfoil having a passage for cooling fluid adjacent a wall in the leading edge region includes a plurality of trip strips extending across the passage which are canted toward the approaching flow and canted with respect to the wall in the leading edge region.

In one detailed embodiment, the passage in the leading edge region is in flow communication with the trailing edge region through a turning passage and a hole connecting the turning passage with the trailing edge region for discharging particulate matter from the first passage and to provide additional cooling to the leading edge region, the turning passage and the trailing edge region.

A primary feature of the present invention is an airfoil having a cooling passage in the leading edge region of the airfoil. A wall in the leading edge region bounds the passage. A plurality of trip strips are angled with respect to the wall and are canted toward the oncoming flow. In one embodiment, the height of the trip strips is greater than ten percent but less than thirty-three percent of the height of the passage. The trip strips extend into proximity with the leading edge of the airfoil. In one embodiment the leading edge region of the airfoil has an elliptically shaped outer surface and a cylindrically shaped inner surface having a radius $r_i$. The plurality of trip strips angled toward the approaching flow have a height which is greater than or equal to the radius $r_i$.

A principal advantage of the present invention is the service life of the airfoil resulting from the thickness of the walls in the leading edge region which protects the airfoil from foreign object damage and the cooling of the thickened walls which prevents undue thermal stress in the walls. In one embodiment, the service life of the airfoil is enhanced by removing particulate matter from the tip region of the airfoil through a conduit which ducts cooling air through low flow regions of the airfoil. Another advantage is the increase in the efficiency of the rotary machine which results from channeling a portion of the cooling flow to increase the cooling effectiveness of the flow.

Other features and advantages will be apparent from the specification and claims and from the accompanying drawings which illustrate an embodiment of the invention.

BEST MODE FOR CARRYING OUT THE INVENTION

Figure 1:
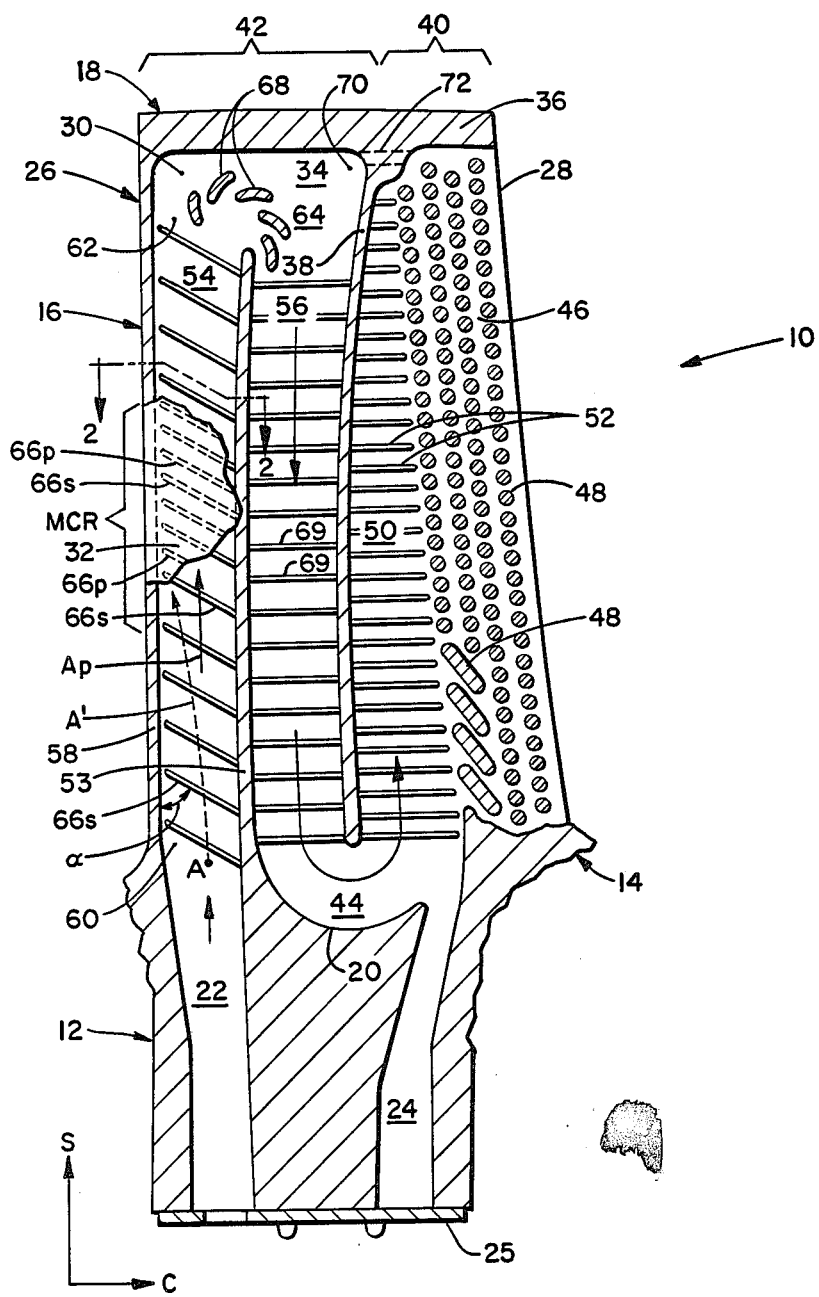
FIG. 1 is a view of a rotor blade partly in section and partly broken away to show the suction sidewall of the rotor blade.

FIG. 1 shows a rotor blade 10 for a rotary machine. The rotor blade has a root section 12, a platform section 14 and an airfoil section 16. The root section is adapted to engage the rotor of a rotary machine. The platform section is adapted to form a portion of the inner wall of the flow path for working medium gases in a rotary machine. The airfoil section is adapted to extend outwardly across the flow path for the working medium gases and has a tip 18 at its most outward end. The rotor blade has reference directions such as the spanwise direction S and the chordwise direction C.

The root section 12 has a chordwisely extending root wall 20. A first duct 22 is in fluid communication through the root wall with a source of cooling air such as a compressor (not shown). A second duct 24 extends through the root wall. A plate 25 extends across the second duct and blocks fluid communication with a source of cooling air (not shown). In an alternate embodiment, the second duct is in fluid communication with the source of cooling air.

The airfoil section 16 has a leading edge 26 and a trailing edge 28. A suction sidewall 30 and a pressure sidewall 32 (partially broken away in FIG. 1 for clarity and shown in FIG. 2) are joined at the leading edge and the trailing edge. The pressure sidewall is spaced from the suction sidewall to form a cavity 34 therebetween. A tip wall 36 and the root wall 20 bound the cavity in the spanwise direction. A first baffle 38 extends in the spanwise direction from the tip wall to divide the cavity into a rear portion 40 and front portion 42. The first baffle is spaced from the root wall leaving a first turning passage 44 therebetween which places the rear portion of the rotor blade in fluid communication with the front portion and with the second duct 24 extending through the root section of the blade. The rear portion of the blade includes a trailing edge region 46. The trailing edge region is in fluid communication with the working medium flow path through a plurality of spaced apart pedestals 48. Each pedestal extends between the suction sidewall and the pressure sidewall to locally block the flow and, with the first baffle, define a spanwisely extending passage 50 for cooling air. A plurality of trip strips 52 are perpendicular to the approaching flow and interfere with the formation of a laminar boundary layer by causing turbulent flow in boundary layer as the flow passes over the trip strips.

A second baffle 53 extends in a spanwise direction from the root wall 20 to divide the front portion 42 of the blade into a first passage 54 and a second passage 56. The first passage is adjacent a third wall 58 in the leading edge region of the blade. The first passage has an upstream end 60 in fluid communication with the first duct 22 and a downstream end 62 in fluid communication through a turning passage 64 with the second passage. A first plurality of trip strips 66s extend across the passage and extend from the suction sidewall. A second plurality of trip strips 66p extend from the pressure sidewall. The trip strips 66p are staggered with respect to the trip strips 66s such that the trip strips 66s, 66p extend alternately across the first passage. The trip strips are canted toward the approaching flow and angled at an acute angle $\alpha$ with respect to the third wall 58. The acute angle $\alpha$ is approximately 30°. The first passage has an axis Ap. The overall direction of flow of the cooling air is parallel to the axis Ap. A plurality of turning vanes 68 are disposed in the turning passage 64 formed between the tip wall 36 and the second baffle which is spaced from the tip wall. The turning vanes extend between the suction sidewall and the pressure sidewall and direct the flow from the first passage into the second passage. The second passage has a plurality of trip strips 69 normal to the flow path of the cooling air.

The turning passage 64 has a corner region 70. In an alternate embodiment of the rotor blade, the rotor blade is provided with a hole 72 in the tip region to divert a portion of the flow from the turning passage 64 to the trailing edge region 46 of the blade. The hole 72 increases the flow of cooling air through the corner region providing additional cooling to the corner region. The area of the hole in the baffle is less than two percent (2%) of the flow area of the first passage and less than two percent (2%) of the flow area of the second passage. The hole also provides a conduit for carrying particulate matter introduced by the cooling air and trapped in the corner region by rotational forces from the tip region of the airfoil to the rear portion of the blade for discharge from the blade.

Figure 2:
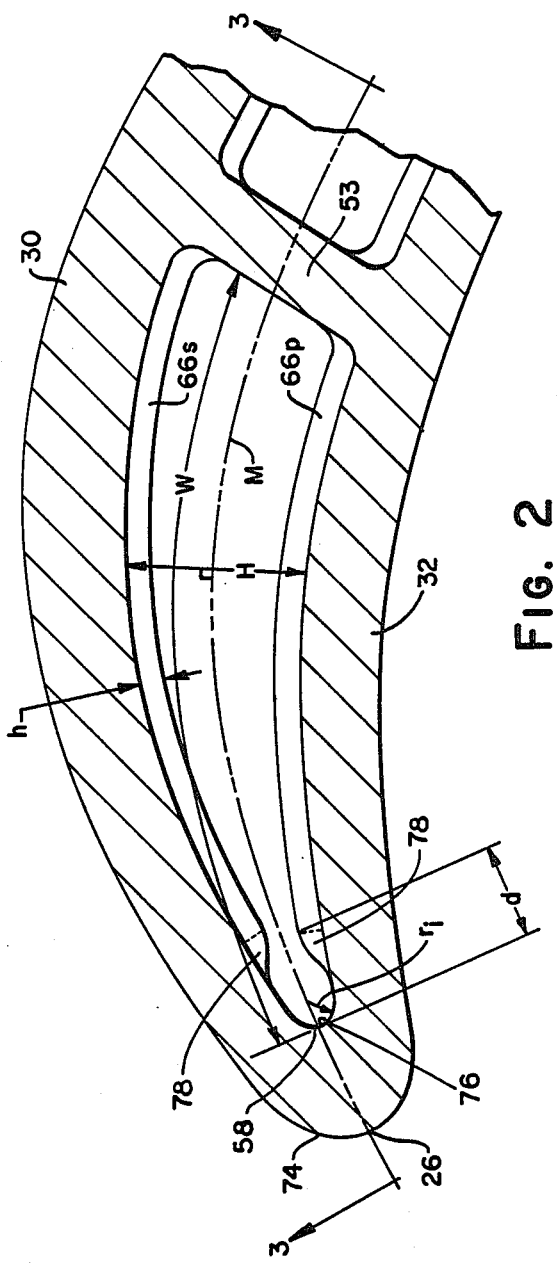
FIG. 2 is a cross-sectional view taken along the lines 2—2 of FIG. 1.

FIG. 2 is a cross sectional view of a portion of the rotor blade shown in FIG. 1 taken along the lines 2—2 of FIG. 1. The rotor blade has an elliptically shaped outer surface 74 and a cylindrically shaped inner surface 76 having a radius $r_i$. The passage at the chordwise section taken along the lines 2—2 of FIG. 1 has a meanline M, a width W measured along the meanline and a height H at any point along a line which is perpendicular to the meanline. The trip strip has a corresponding height h which is more than ten percent (10%) but less than thirty-three percent (33%) of the height of the passage. Each trip strip extends across the width of the passage into proximity with the leading edge region of the airfoil. The airfoil has a transition piece 78 extending from the pressure sidewall and the suction sidewall to each trip strip. The transition piece is integrally formed with the trip strip to reduce stress concentrations at the end of the trip strip. The trip strip is spaced from the wall 58 in the leading edge region by a distance d. The distance d has a value equal to or greater than the height h of the trip strip but is less than or equal to five times the height of the trip strip ($h \leq d \leq 5h$). As shown in FIG. 1 and FIG. 2, the trip strips 66p disposed on the pressure sidewall are each parallel to and spanwisely from an adjacent trip strip on the suction sidewall.

During operation of the rotor blade, cooling air is flowed through the root section via the first duct 22. Cooling air leaving the first duct enters the upstream end 60 of the first passage 54 adjacent the leading edge region 26, of the blade. The air is flowed over the trip strips and the bulk of the air proceeds parallel to the axis of the first passage as shown by the line marked Ap in FIG. 1.

Figure 3:
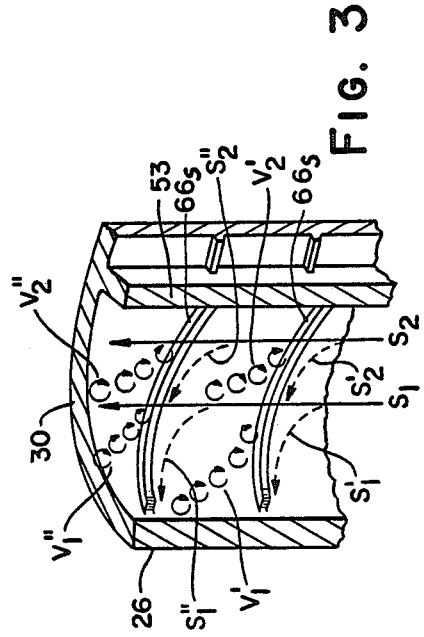
FIG. 3 is a partial perspective view along the lines 3—3 of FIG. 2 and schematically illustrates a portion of the flow in the leading edge region of the rotor blade.

FIG. 3 is a schematic illustration of the interaction between two streamlines $S_1$ and $S_2$ of the cooling air as the cooling air passes over two trip strips 66s on the suction surface of the airfoil. These two streamlines are adjacent the suction surface of the airfoil, and as they pass over the trip strips, a portion of the flow along the streamline is diverted towards the leading edge region as shown by the dotted lines $S_140$, $S_1''$, $S_2'$, and $S_2''$. In addition, as the streamlines pass over the trip strips, small vortices are formed on the upstream side of the trip strips and by reason of the angled nature of the trip strips, are shed with a component of velocity extending in the chordwise direction causing the small vortices to move towards the leading edge region and into the leading edge region as shown by the vortices $V_1'$ and $V_1''$ causing turbulence in the leading edge region and interfering with the formation of a laminar boundary layer in the leading edge region. Other vortices ($V_2'$, $V_2''$) move in that general direction interfering with the formation of the laminar boundary layer between the mainstream flow and the wall by causing turbulent flow in the boundary layer. This action increases the heat transfer between the suction sidewall and the cooling airflow. Experiments on water models of the blade confirms (through the injection of a dye at point A in FIG. 1) that the trip strips cuase the portion ofthe flow adjacent the trip strips to move into the leading edge region of the boundary layer as shown by the dotted line A'. This diversion of flow is especially helpful as the flow enters the midchord region MCR of the blade causing turbulence and additional cooling in the very narrow leading edge portion of the first passage. The midchord region MCR of the blade is a critical heat transfer area because of the thickness of the walls and the amount of heat transferred to the region by the working medium gases. The critical midchord region (MCR) is efficiently cooled with the augmented, turbulent flow induced by the angled trip strips. As the flow leaves the first passage and moves through the turning vanes, the flow is partially blocked from portions of the air-foil by the turning vanes. By reason of the thinness of the tip region, the blockage of flow is not accompanied by a severe thermal stress penalty as would be associated with the blockage of such flow in the midchord region MCR of the blade. The cooling air is flowed through the turn and is flowed via the second passage 56 through the first turning passage 44 to the passage 50 in the rear portion of the blade.

In the alternate embodiment in which the second duct 24 and the turning passage 44 are in flow communication with a source of cooling air, the second duct and turning passage act as an injector at the point of junction between the turning passage in the duct drawing the flow of cooling air through the leading edge region to the trailing edge region where it is used for further cooling before discharge from the blade.

A distinct and particular advantage of this invention is the increase turbulence in the leading edge region leading to increased cooling in the critical midchord region of the blade. While trip strips having an angle of 30° are used, it is believed that trip strips having an angle lying between 15° and 60° will prove effective depending on the velocity of the flow in the passage and on the height of the trip strips. In the particular embodiment shown, trip strips 66s and 66p have a nominal height of fifteen thousandths of an inch (0.015 inches) with a tolerance of plus or minus three thousandths of an inch (±0.003 inches).

Although this invention has been shown and described with respect to a preferred embodiment, it will be understood by those skilled in this art that various changes in form and detail thereof may be made without departing from the spirit and scope of the claimed invention.

We claim:

1. In a coolable airfoil of the type having a leading edge region, a wall in the leading edge region and a passage for a cooling fluid flow bounded by the wall in the leading edge region, the passage having a height H and having at any point an approaching flow direction toward said point, the improvement which comprises:

a plurality of trip strips extending across the passage which are canted toward the approaching flow direction and angled at an acute angle with respect to said wall, each trip strip extending across the width of the passage into proximity with the leading edge region of the airfoil and each trip strip having a height which is more than ten percent but less than thirty-three percent of the height of the passage, wherein the trip strips promote tubulence in the flow to increase heat transfer between the cooling fluid and the airfoil and wherein the trip strips divert a portion of the flow against said wall and cause the formation of vortices which promote turbulence in the fluid adjacent said wall.

2. The coolable airfoil of claim 1 wherein said wall is a first wall and the airfoil further has a baffle having a second wall spaced from the first wall which extends in the same direction as the first wall, wherein the trip strip extends from the second wall toward the first wall and is spaced from the first wall by a distance d, the distance d having a value equal to or greater than the height h of the trip strip but less than or equal to five times the height of the trip strip (h≦d≦5h).

3. The coolable airfoil of claim 2 wherein the airfoil has a suction sidewall and a pressure sidewall and the plurality of trip strips are a first plurality of trip strips disposed on the suction sidewall, and wherein a plurality of second trip strips are each disposed on the pressure sidewall and are each spaced spanwisely from and parallel to an adjacent trip strip on the suction sidewall such that the trip strips are disposed along the passage in alternating succession between the pressure sidewall and the suction sidewall.

4. The coolable rotor blade of claim 2 wherein the acute angle is equal to thirty (30) degrees.

5. The coolable airfoil of claim 1 wherein the wall in the leading edge region has an elliptically shaped outer surface, a cylindrically shaped inner surface having a radius $r_i$ and wherein the height of the trip strip is greater than the radius $r_i$.

6. A coolable rotor blade for an axial flow rotary machine which comprises:

a root section which adapts the rotor blade to engage a rotor assembly, the root section having a chordwisely extending root wall, a first duct adapted to be in fluid communication through the root wall with a source of cooling air and a second duct extending through the root wall, an airfoil section having
- a leading edge,
- a trailing edge,
- a suction sidewall,
- a pressure sidewall joined to the suction sidewall at the leading edge and the trailing edge and spaced from the suction sidewall to form a cavity therebetween,
- a tip wall extending in a chordwise direction between the suction sidewall and the pressure sidewall,
- a first baffle which extends in the spanwise direction from the tip wall to divide the cavity into a rear portion and a front portion and which is spaced from the wall in the root section leaving a first turning passage therebetween,
- a second baffle which extends in the spanwise direction from the root wall to divide the front portion into a first passage extending outwardly from the root region to the tip region and a second passage extending inwardly from the tip region to the root region, the second baffle being spaced from the tip wall leaving a second turning passage therebetween, wherein the first pasage has at any point an approaching flow direction, and has a plurality of trip strips in the first passage which extend across the width of the passage into proximity with the leading edge region, which have a height which is more than ten percent but less than thirty-three percent of the height of the passage, which are canted toward the approaching flow direction and angled at an acute angle with respect to the wall in the leading edge region of the first passage to cause turbulence in the boundary layer of the suction sidewall, the pressure sidewall and in the leading edge region and to direct the cooling air towards the leading edge region to increase cooling of the leading edge region and along the pressure sidewall and suction sidewall, wherein the second turning passage has a corner region and a plurality of turning vanes to direct the flow to the second passage, wherein the second passage has plurality of trip strips perpendicular to the direction of the flow, wherein the first turning passage extends between the second passage and the rear portion to place the rear portion in flow communication with the second passage, and wherein the rear portion of the blade has a plurality of pedestals extending between the suction sidewall and the pressure sidewall having spaces therebetween to provide for the discharge of cooling air from the rotor blade, the plurality of pedestals being spaced from the first baffle to define a passage for cooling air in the rear portion of the blade, the passage having a plurality of trip strips perpendicular to the approaching flow.

7. The coolable rotor blade as claimed in claim 6 wherein said second turning passage is in fluid communication with said second duct in the root region, and the second duct is in fluid communication with a source of cooling air to introduce additional air into the rear portion of the blade.

8. The coolable rotor blade as claimed in claim 6 wherein the root region of the blade has a plate extending across the second duct to block fluid communication between the second duct and a source of cooling air.

9. A coolable rotor blade for an axial flow rotary machine which comprises:

a root section which adapts the rotor blade to engage a rotor asembly, the root section having a chordwisely extending root wall, a first duct adapted to be in fluid communication through the root wall with a source of cooling air flow and a second duct extending through the root wall, an airfoil section having
- a leading edge,
- a trailing edge,
- a suction sidewall,
- a pressure sidewall joined to the suction sidewall at the leading edge and the trailing edge and spaced from the suction sidewall to form a cavity therebetween,
- a tip wall extending in a chordwise direction between the suction sidewall and the pressure sidewall,
- a first baffle which extends in the spanwise direction form the tip wall to divide the cavity into a rear portion and a front portion and which is spaced from the wall in the root section leaving a first turning passage therebetween,
- a second baffle which extends in the spanwise direction from the root wall to divide the front portion into a first passage extending outwardly from the root region to the tip region and a second passage extending inwardly from the tip region to the root region, the second baffle being spaced from the tip wall leaving a second turning passage therebetween, wherein the first passage has at any point an approaching flow direction, and has a plurality of trip strips in the first passage which are canted with respect to the approaching flow direction toward said point and angled with respect to the wall in the leading edge region of the first passage to cause turbulence in the boundary layer of the suction sidewall, the pressure sidewall and in the leading edge region and to direct the cooling air towards the leading edge region to increase cooling of the leading edge region and along the pressure sidewall and suction sidewall, wherein the second turning passage has a corner region and a plurality of turning vanes to direct the flow to the second passage, wherein the second passage has a plurality of trip strips perpendicualr to the direction of the flow, wherein the first turning passage extends between the second passage and the rear portion to place the rear portion in flow communication with the second passage, wherein the rear portion of the blade has a plurality of pedestals extending between the suction sidewall and the pressure sidewall having spaces therebetween to provide for the discharge of cooling air from the rotor blade, the plurality of pedestals being spaced from the first baffle to define a passage for cooling air in the rear portion of the blade, the passage having a plurality of trip strips perpendicular to the approaching flow, and wherein the first baffle has a hole in the tip region connecting the second turning passage with the rear portion of the blade to duct cooling air through the first turning passage to increase the flow of cooling air in the tip region of the first baffle through the corner region and to carry particulate matter from the rotor blade.

10. The rotor blade as claimed in claim 9 wherein the area of the hole in the first baffle is less than two percent (2%) of the flow area of the first passage and less than two percent (2%) of the flow area of the second passage.

* * * * *